(12) United States Patent
Bowman et al.

(10) Patent No.: US 10,362,132 B2
(45) Date of Patent: *Jul. 23, 2019

(54) SYSTEM AND METHOD FOR DIVERTING ESTABLISHED COMMUNICATION SESSIONS ON THE BASIS OF CONTENT (71) Applicant: SANDVINE INCORPORATED ULC, Waterloo (CA)

(72) Inventors: Don Bowman, Waterloo (CA); David Dolson, Waterloo (CA)

(73) Assignee: SANDVINE CORPORATION, Vancouver, BC (CA)

( * ) Notice: Subject to any disclaimer, the term of this patent is extended or adjusted under 35 U.S.C. 154(b) by 43 days.

This patent is subject to a terminal disclaimer.

(21) Appl. No.: 15/238,891

(22) Filed: Aug. 17, 2016

(65) Prior Publication Data

US 2016/0359996 A1   Dec. 8, 2016

Related U.S. Application Data

(63) Continuation of application No. 10/395,081, filed on Mar. 25, 2003, now Pat. No. 9,432,463.

(51) Int. Cl.
*G06F 15/16* (2006.01)
*H04L 29/08* (2006.01)
*H04L 12/747* (2013.01)
*H04L 29/06* (2006.01)

(52) U.S. Cl.
CPC ........ *H04L 67/2814* (2013.01); *H04L 45/742* (2013.01); *H04L 67/1002* (2013.01); *H04L 67/14* (2013.01); *H04L 67/148* (2013.01); *H04L 67/327* (2013.01); *H04L 69/161* (2013.01); *H04L 69/329* (2013.01)

(58) Field of Classification Search
CPC .... H04L 67/1002; H04L 67/327; H04L 67/14
See application file for complete search history.

(56) References Cited

U.S. PATENT DOCUMENTS

| 6,006,264 | A | 12/1999 | Colby et al. |
| 6,431,772 | B1 | 8/2002 | Melo et al. |
| 6,529,515 | B1 * | 3/2003 | Raz .......................... H04L 29/06 370/396 |
| 7,000,027 | B2 | 2/2006 | Hensbergen |
| 7,139,268 | B1 * | 11/2006 | Bhagwat ................. H04L 47/10 370/389 |
| 9,432,463 | B2 * | 8/2016 | Bowman ............... H04L 45/742 |
| 2003/0041165 | A1 * | 2/2003 | Spencer .............. H04L 12/1827 709/233 |

(Continued)

OTHER PUBLICATIONS

Canadian Intellectual Property Office, Office Action on Canadian Patent Appln. No. 2,935,363, dated May 2, 2017.

(Continued)

*Primary Examiner* — Dhairya A Patel
(74) *Attorney, Agent, or Firm* — Gowling WLG (Canada) LLP; Neil W. Henderson (57) ABSTRACT

The present invention is related to a system and method for examining a communication stream between two nodes for a protocol of interest. If a protocol of interest is found, the communication stream is diverted to a divert host. If a protocol of interest is not found, the stream passes without diversion. By way of example, the invention is shown to work with TCP and UDP.

12 Claims, 7 Drawing Sheets

(56) References Cited

U.S. PATENT DOCUMENTS

| | | | |
|---|---|---|---|
| 2003/0088676 A1 | 5/2003 | Smith et al. | |
| 2003/0101273 A1* | 5/2003 | Hensbergen | H04L 29/06 709/232 |
| 2003/0177253 A1* | 9/2003 | Schuehler | H04L 43/18 709/230 |
| 2003/0208621 A1* | 11/2003 | Bowman | H04L 29/06 709/242 |
| 2004/0193714 A1* | 9/2004 | Bowman | H04L 45/742 709/227 |
| 2012/0026900 A1* | 2/2012 | Chandrasekaran | H04L 41/0672 370/252 |

OTHER PUBLICATIONS

United States Patent and Trademark Office, Office Action on U.S. Appl. No. 10/395,081, dated Jul. 25, 2006.
United States Patent and Trademark Office, Final Office Action on U.S. Appl. No. 10/395,081, dated Feb. 23, 2007.
United States Patent and Trademark Office, Office Action on U.S. Appl. No. 10/395,081, dated Aug. 10, 2007.
United States Patent and Trademark Office, Final Office Action on U.S. Appl. No. 10/395,081, dated Mar. 31, 2008.
United States Patent and Trademark Office, Office Action on U.S. Appl. No. 10/395,081, dated Dec. 8, 2008.
United States Patent and Trademark Office, Final Office Action on U.S. Appl. No. 10/395,081, dated Aug. 20, 2009.
United States Patent and Trademark Office, Office Action on U.S. Appl. No. 10/395,081, dated Mar. 22, 2010.
United States Patent and Trademark Office, Office Action on U.S. Appl. No. 10/395,081, dated Sep. 18,2015.
United States Patent and Tradmeark Office Board of Patent Appeals and Interferences, Examiner's Answer to Appeal Brief on U.S. Appl. No. 10/395,081, dated Aug. 8, 2011.
United States Patent and Trademark Office Patent Trial and Appeal Board, Decision on Appeal, dated Apr. 23, 2015.
Canadian Patent Office, Office Action on Canadian Patent Appln. No. 2,751,657, dated Sep. 30, 2013.
Canadian Patent Office, Office Action on Canadian Patent Appln. No. 2,751,657, dated Oct. 2, 2014.
Spatscheck et al., "Optimizing TCP Forwarder Performance", Apr. 2, 2000, IEEE vol. 8, 1-14.
Cisco Systems, Network-based Application Recognition (Cisco NBAR), White Paper, Online! 1999, pp. 1-6, XP002261077, Retrieved from the Internet: URL: www.cisco.com, retrieved on Nov. 7, 2003, pp. 1-3.

* cited by examiner

SYSTEM AND METHOD FOR DIVERTING ESTABLISHED COMMUNICATION SESSIONS ON THE BASIS OF CONTENT

The present application is a continuation of U.S. patent application Ser. No. 10/395,081, filed on Mar. 25, 2003.

FIELD OF THE INVENTION

The present invention relates generally to a method and system for diverting an in-progress communication session. The communication protocol being used by a communication session is identified by inspection so as to allow diverting of communication sessions based upon the protocol.

BACKGROUND OF THE INVENTION

In a data communications network it is sometimes desirable to divert data to a destination other than the destination addressed by an initiator. One common example is that of Internet web page caching, in which a request for web content may be directed to a geographically local server containing the same content rather than to the server addressed by the initiator. This reduces the communication fees.

Another example is that of peer-to-peer optimization, in which a request for a particular file is directed to a geographically local peer known to have the file. This optimization reduces the communication fees. An invention to redirect requests to reduce communication fees in a Peer to Peer network (P2P) is disclosed in U.S. application Ser. No. 10/138,336 and is herein incorporated by reference.

A first step in solving the problem of diverting data is by identifying communication sessions, which are using a protocol that can be diverted. In previous solutions, identification has been based simply on port number. The port number is found in every Transmission Communication Protocol (TCP) and User Datagram Protocol (UDP). Internet web caching has been done simply by forwarding all traffic destined for TCP port 80 to the caches. Since all packets including the very first are diverted, there is never any contact with the intended destination.

Current products, such as Alteon provided by Nortel Networks use a technique known as hierarchical search: a selection of traffic based on port number can be analyzed. Such searches require that a device accept connections as a full proxy. The protocol identification is inherently limited to examining content from the initiator of a communication session.

Optimizing peer-to-peer transfers is more difficult because the peer-to-peer protocols do not use fixed port numbers. These so-called dynamic-port protocols use randomly selected ports or share port numbers, such as 80, with other protocols. Thus, the content of the communication session must be analyzed for the tell tale signatures of peer-to-peer protocols.

Some current simple solutions for identifying protocols can classify communication sessions on the basis of examining single packets such as the Network Based Application Recognition (NBAR) product provided by Cisco Systems, Inc. If any packet matches a classification, all subsequent packets of the communication session can be marked to identify the protocol. NBAR does not provide the ability to redirect packets, nor is it able to mark all packets in a communication session, as some are lost before classification is made.

Other solutions use a full proxy technique. The network device accepts a connection from an initiator, examines the content and possibly opens a new session to the intended acceptor. Even if the protocol is not of interest, these two sessions must be managed by the device for the duration of the communication session. The content of the communication session must be analyzed to identify any protocol that doesn't use standardized port numbers.

Thus, there is need for a device, which can divert in-progress sessions based on the content of the initial, few packets of a communication session.

SUMMARY OF THE INVENTION

The present invention relates to a system and method for diverting an in progress communication session.

One aspect of the present invention is a method for examining a communication session, the session comprising a plurality of packets between a first node and a second node, the method comprising the steps of;

a) if the first node or the second node is attempting to initiate a new communication session, and a session state record does not exist, creating a session state record;

b) if the first node or the second node is not attempting to initiate a new communication session and a session state record does not exist, passing the packets between the first node and the second node;

c) if a session state record exists, for the communication session, utilizing the state of the session state record;

d) if step c) determines that the state is INSPECT, examining the plurality of packets to determine if the communication session matches a protocol of interest;

e) if the examining of step d) determines the communication session does not match a protocol of interest, deleting the session state record; and f) if the examining of step d) determines the communication session does match a protocol of interest, and is to be diverted, setting the session state record to DIVERT, initiating a connection with a divert host and splicing the communication session to the divert host.

In another aspect of the present invention there is provided a system for diverting a communication session between an initiator and an acceptor the system comprising;

a) a session state manager, for managing the state of the communication session; the session state manager not maintaining state for communications sessions not of interest and passing the packets of the communication sessions not of interest to either the initiator or the acceptor as required;

b) a protocol state machine operatively coupled to the session state manager, the protocol state machine tracking the state of the communication session, the protocol state machine comprising means for splicing the communication session to a divert host; and c) a pattern state machine operatively coupled to the protocol state machine, the pattern state machine inspecting the communication session for protocols of interest.

In another aspect of the present invention there is provided a system for examining a communication session, the session comprising a plurality of packets between a first node and a second node, the system comprising;

a) means for creating a session state record, the means for creating being invoked if the first node or the second node is attempting to initiate a new communication session, and a session state record does not exist;

b) means for passing the packets between the first node and the second node, the means for passing being invoked if the first node or the second node is not attempting to initiate a new communication session and a session state record does not exist;

c) means for utilizing the state of the session state record, the means for utilizing being invoked if a session state record exists, for the communication session;

d) means for examining the plurality of packets to determine if the communication session matches a protocol of interest, the means for examining being invoked if the means for utilizing determines that the state is INSPECT;

e) means for deleting the session state record, the means for deleting being invoked if the means for examining determine the communication session does not match a protocol of interest; and f) means for initiating a connection with a divert host, means for splicing the communication session to the divert host and means for setting the session state record to DIVERT, the means for initiating, means for splicing and means for setting being invoked if the means for examining determine the communication session does match a protocol of interest, and is to be diverted.

In yet another aspect of the present invention there is provided a computer readable medium comprising instructions for examining a communication session, the session comprising a plurality of packets between a first node and a second node, the medium comprising;

a) instructions for creating a session state record the instructions invoked if the first node or the second node is attempting to initiate a new communication session, and a session state record does not exist.

b) instructions for passing the packets between the first node and the second node, the instructions for passing being invoked if the first node or the second node is not attempting to initiate a new communication session and a session state record does not exist;

c) instructions for utilizing the state of the session state record, the instructions for utilizing being invoked if a session state record exists, for the communication session;

d) instructions for examining the plurality of packets to determine if the communication session matches a protocol of interest, the instructions for examining being invoked if the means for utilizing determines that the state is INSPECT;

e) instructions for deleting the session state record, the instructions for deleting being invoked if the instructions for examining determine the communication session does not match a protocol of interest; and f) instructions for initiating a connection with a divert host, instructions for splicing the communication session to the divert host and instructions for setting the session state record to DIVERT, the instructions for initiating, instructions for splicing and instructions for setting being invoked if the instructions for examining determine the communication session does match a protocol of interest, and is to be diverted.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which.

DETAILED DESCRIPTION OF THE INVENTION

In diverting a communication session already in progress, the following should be considered:

1) In order to identify some protocols it may be necessary to look at the initial data sent by the acceptor that was contacted. In other protocols, data from more than one data packet (possibly in both directions) must be analyzed. Therefore a decision to divert cannot be made without allowing the connection to complete.

2) A challenge with TCP communication sessions is that the content is not usually transmitted until the third or fourth data packet of the communication session arrives after communication setup.

3) It is undesirable to divert communication sessions that are not of a recognized protocol. Allowing connections for all communication sessions to complete normally means that there is no impact on communication sessions of other protocols. Furthermore, it is not necessary to perform full proxy on communication sessions that are not of interest 4) If a session is already in progress, it is known that both nodes of the communication session are in a healthy state, something not known if the targeted node is not used.

The present invention is placed within a data communications network. In the preferred embodiment, the present invention would reside in a point through which all communication sessions to be analyzed must pass.

Figure 1:
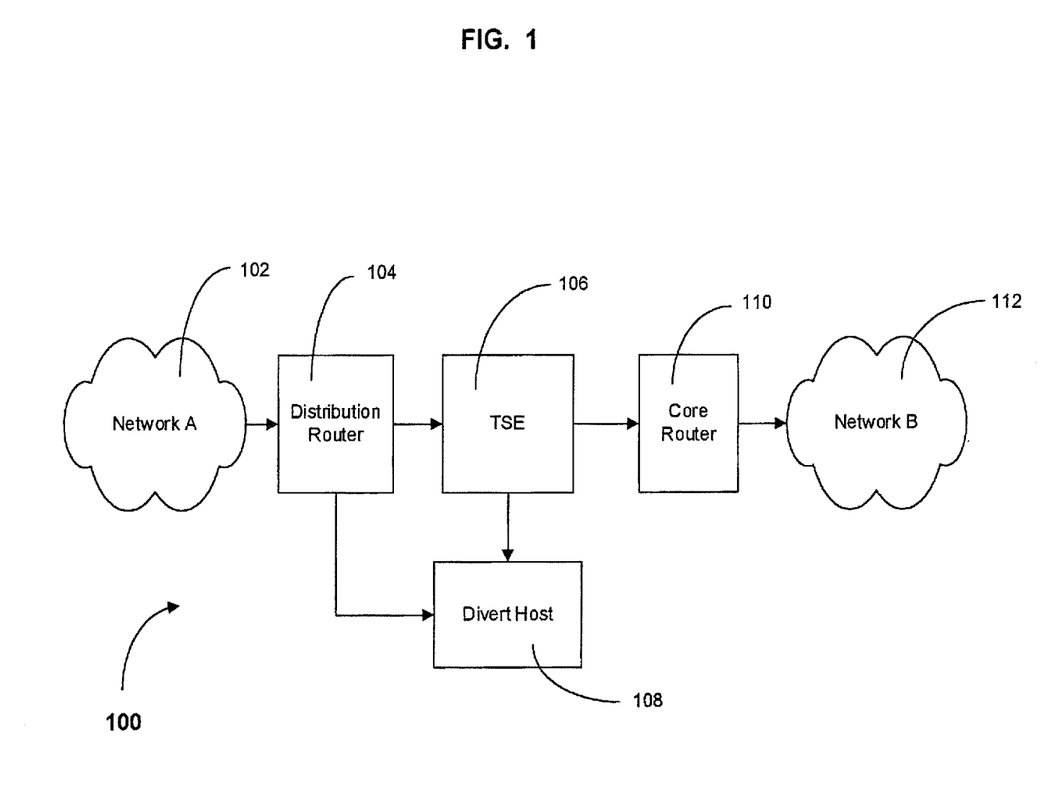
FIG. 1 is a block diagram of system utilizing the present invention.

Referring now to FIG. 1, a diagram of a system utilizing the present invention is shown generally as 100. By way of example system 100 is shown routing packets from an initiator (not shown) in network A (102) to either an acceptor (not shown) in network B or a divert host 108. FIG. 1 serves only as an example of one configuration. The initiator may reside in Network A (102) or Network B (112). Further the initiator, acceptor and divert host 108 may all reside in the same network. The point here being that the node on each end of the communication session may be located anywhere. In the example of FIG. 1, distribution router 104 receives packets from the initiator in Network A (102) and transmits them either to Traffic Switching Element (TSE) 104 or divert host 108. TSE 106 examines the communications stream from distribution router 104 and either initiates a new communication session to divert host 108 or passes it on to core router 110. When TSE 106 initiates a new communication session to divert host 108 it also splices into that session all packets, save for the initial connection packets, which it has received to date. The inventors refer to this as splicing as it effectively splices the communication stream from an initiator, or an acceptor or perhaps both, to divert host 108. The inventors refer to this as splicing as it effectively splices the communication stream from an initiator, or an acceptor or perhaps both, to divert host 108. In the case of splicing an initiator, divert host 108 replaces an acceptor. In the case of splicing an acceptor, divert host replaces an initiator. In the case of both, divert host replaces both initiator and acceptor.

Divert host 108 is designed to accept connections addressed to any host on the network as though it were that host. It decodes the encapsulation information provided by TSE 106 to determine which protocol to process. In the present invention encapsulation may be accomplished by using, but is not limited to the use of: Virtual Local Area Network tagging (VLAN, IEEE 802.1q), Multilabel Protocol Switching (MPLS), and Generic Routing Encapsulation (GRE, Network Working Group RFC 2784).

Core router 110 passes the packets in the communication session to a node acting as an acceptor in Network B (feature 112).

Figure 2:
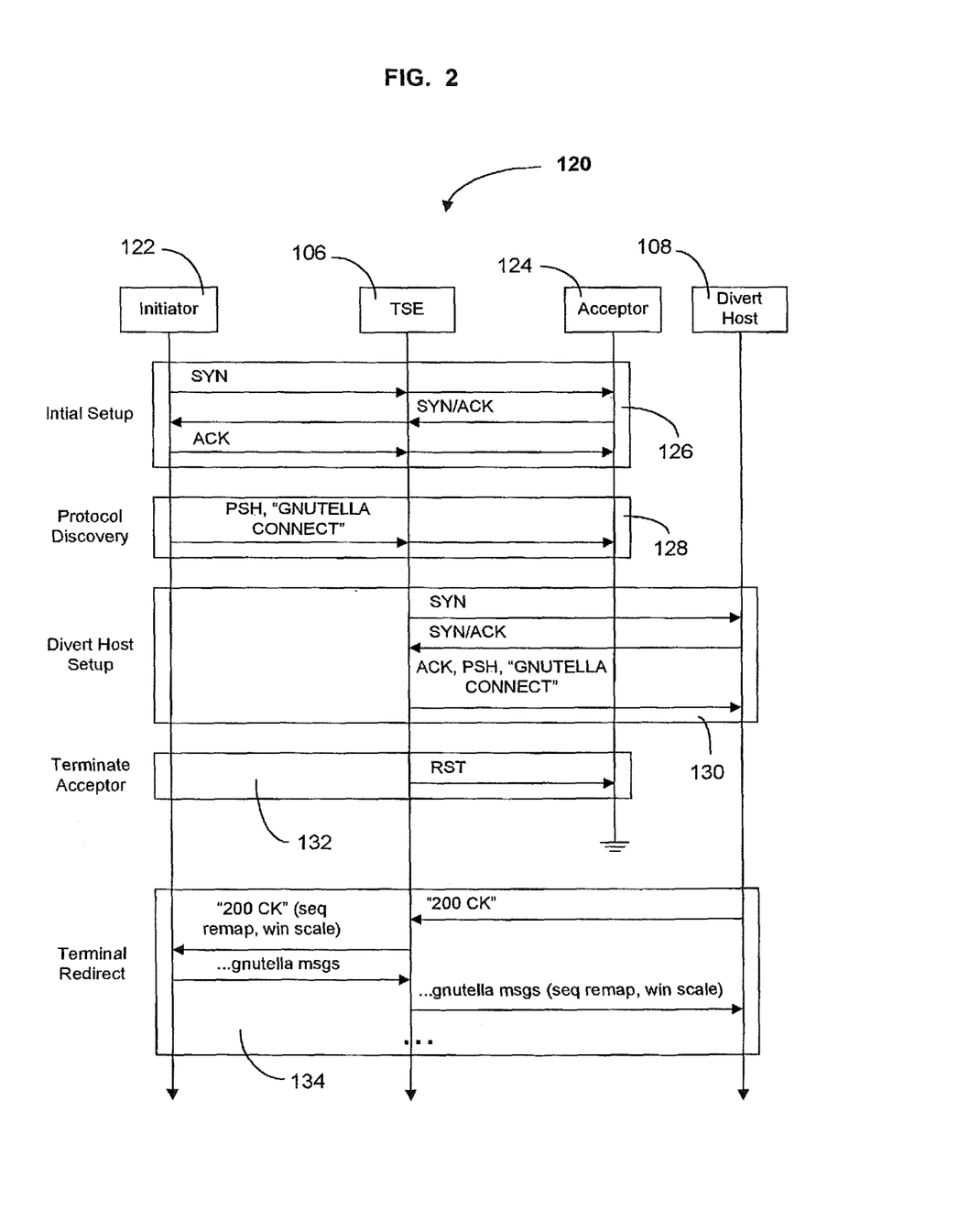
FIG. 2 is communications flow diagram illustrating diversion of a TCP communication session based upon content sent by an initiator.

Referring now to FIG. 2, a communications flow diagram illustrating diversion of a TCP communication session based upon content sent by an initiator is shown generally as 120. At initial setup 126, initiator 122 attempts to establish a communication session with acceptor 124. TSE 106 monitors this attempt. By way of example, protocol discovery 128 identifies a packet containing a signature of "GNUTELLA CONNECT" in the first packet sent by initiator 122. After recognizing this signature TSE 106 duplicates the initiation connection messages to divert host 108 through divert host setup 130. Terminate acceptor 132 then closes the connection to acceptor 124. Finally, terminal redirect 134 joins initiator 122 to divert host 108.

Figure 3:
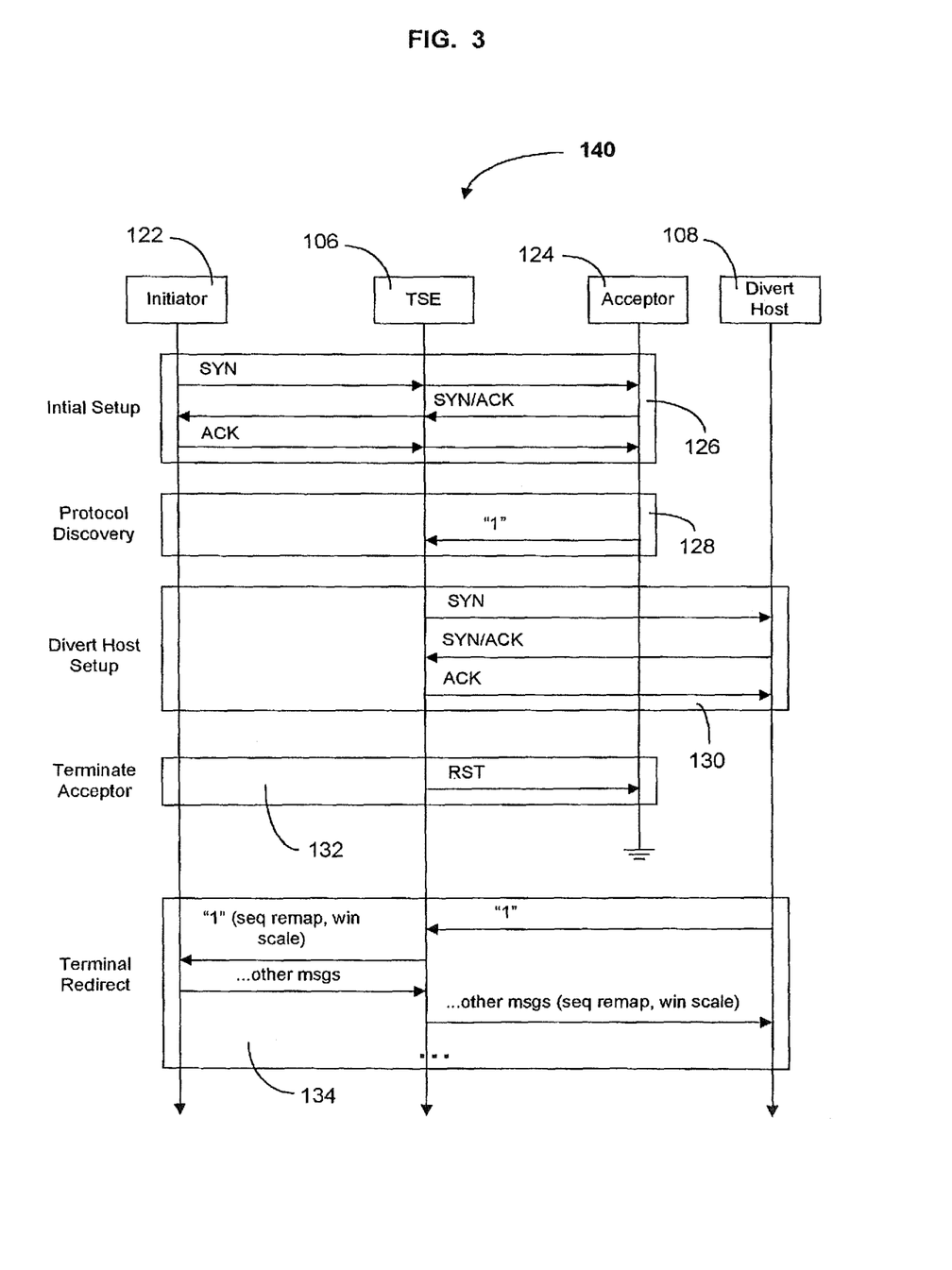
FIG. 3 is communications flow diagram illustrating diversion of a TCP communication session based upon content sent by an acceptor.

In another example of diversion of a communication session we now refer to FIG. 3. FIG. 3 is a communications flow diagram illustrating diversion of a TCP communication session based upon content sent by an acceptor and is shown generally as 140. At initial setup 126, initiator 122 attempts to establish a communication session with acceptor 124. TSE 106 monitors this attempt. By way of example, protocol discovery 128 identifies the signature "1" in the first packet sent by acceptor 124. After recognizing this signature TSE 106 duplicates the initiation connection messages to divert host 108 through divert host setup 130. Terminate acceptor 132 then closes the connection to acceptor 124. Finally, terminal redirect 134 joins initiator 122 to divert host 108.

For the examples illustrated in FIG. 2 and FIG. 3 the connection with acceptor 124 is terminated after forming a connection with divert host 108. This connection could have been terminated prior to forming a connection with divert host 108, but the sequence in the examples has the advantage of permitting fall-back to the intended communication if for some reason divert host 108 was unavailable.

Figure 4:
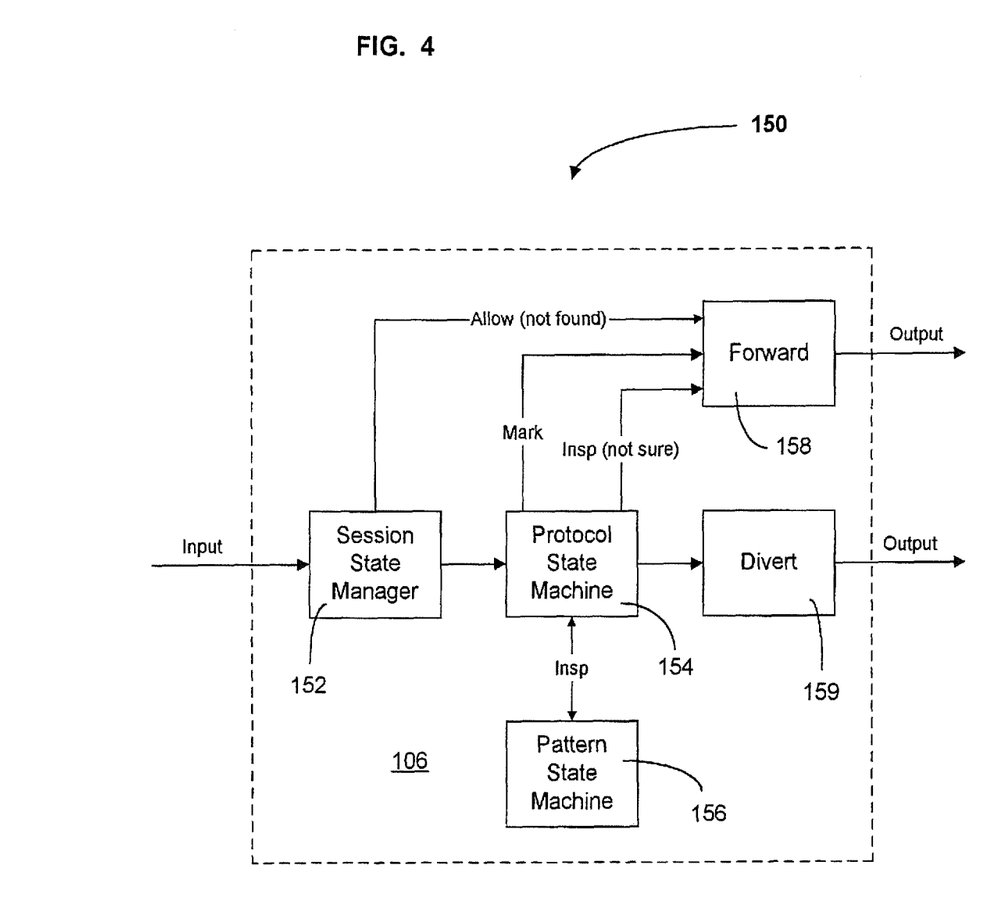
FIG. 4 is a packet flow diagram of an implementation of a TSE.

Referring now to FIG. 4 a packet flow diagram of an implementation of TSE 106 is shown generally as 150.

The main components of TSE 106 are: session state manager 152, protocol state machine 154, and pattern state machine 156. Session state manager 152 maintains a session state record (not shown) for each communication session, at least initially. The session state record is used by both protocol state machine 154 and pattern state machine 156 to track the progression of a communication session.

Packets arrive at session state manager 152. Packets may come from an initiator 122 an acceptor 124 or a divert host 108. When session state manager 152 receives a packet, it first determines if the packet is an attempt to start a new communication session. If this is the case state manager 152 creates a new session state record. By way of example, in a TCP session, a new state record will only be created if the packet has the SYN flag set. If the packet indicates a communication session already in progress, state manager 152 searches for a corresponding session state record in a session state table. If a state record cannot be found, an "allow" state is implied and the packet is allowed to proceed to its intended destination via forward module 158. This is the mechanism for allowing packets from protocols which are not of interest to pass without consuming state memory.

If session state manager 152 determines that a state record exists, the current packet is examined by protocol state machine 154. If the session state record indicates DIVERT, then the packet is sent to a divert host 108 via divert module 159. If the session state record is in MARK state, the packet is marked and sent to its intended destination via forward module 158. If the session state record is in INSPECT state the packet is sent to pattern state machine 156 to be examined. If pattern state machine identifies the packet to be part of a protocol of interest, then it sets the session state record to DIVERT and protocol state machine 154 then sends the packet to a divert host 108 via divert module 159. If pattern state machine 156 concludes that no protocol of interest exists, then the session state record is deleted, thus allowing all packets to pass directly through TSE 106 without maintaining state. If pattern state machine 156 determines that the packets of the communication session should be marked, the session state record is changed to MARK so that all packets are marked before being sent by forward module 158.

Session state records will be deleted in the cases of a pattern match resulting in "allow", timeout due to inactivity, or indications that the session cannot be diverted for other reasons. Other reasons may include the inability to connect to a host or the presence of unsupported communication options.

In the preferred embodiment of the present invention, a different protocol state machine 154 is required for each communications transport protocol of interest. (e.g. TCP, UDP).

As indicated previously, TSE 106 may redirect initiator/acceptor communications to initiator/divert host and it may also redirect initiator/acceptor communications to a divert host/acceptor.

Figure 5A:
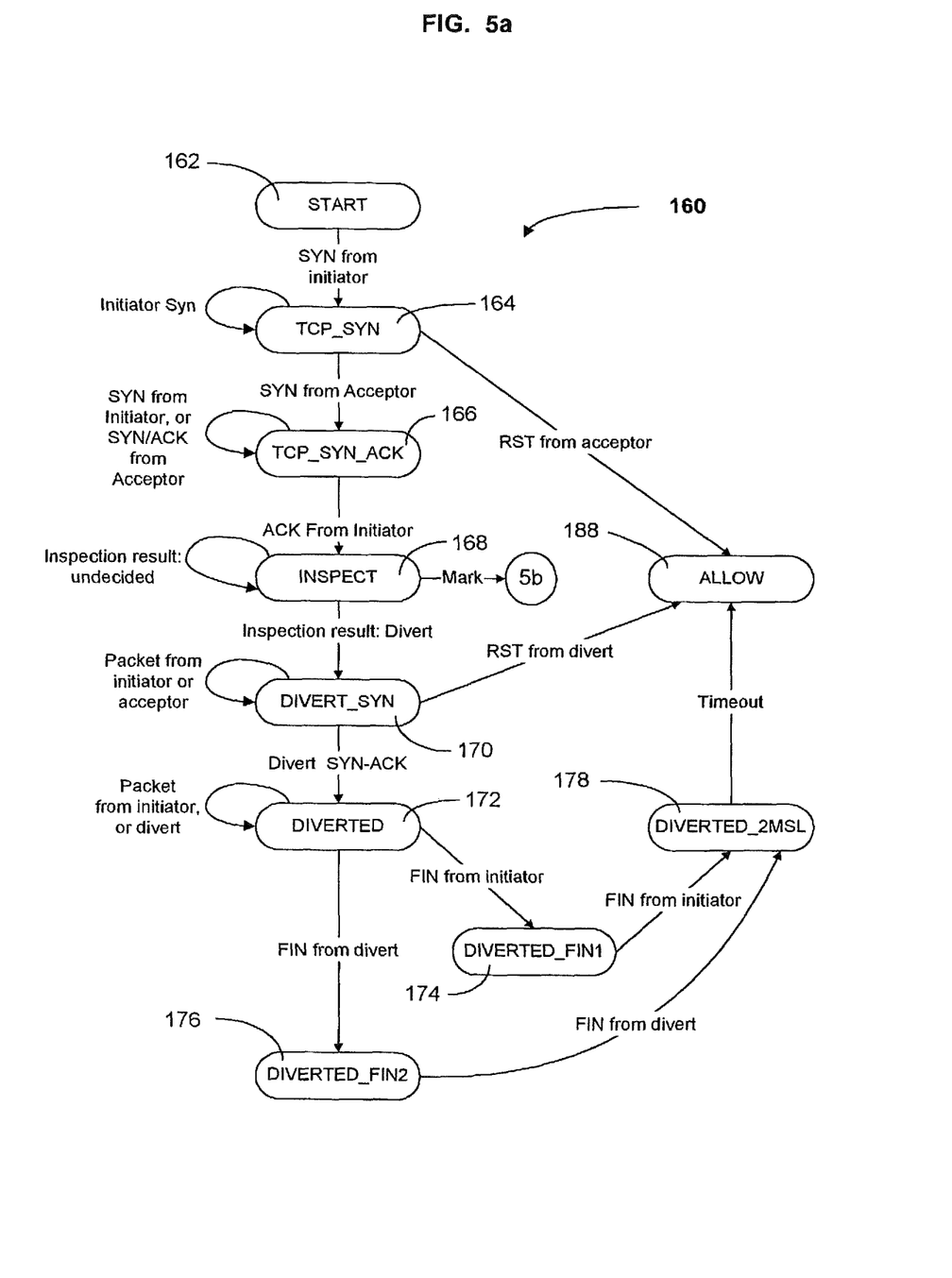
FIGS. 5a and 5b are state diagrams of the states of a TCP protocol state machine.
Figure 5B:
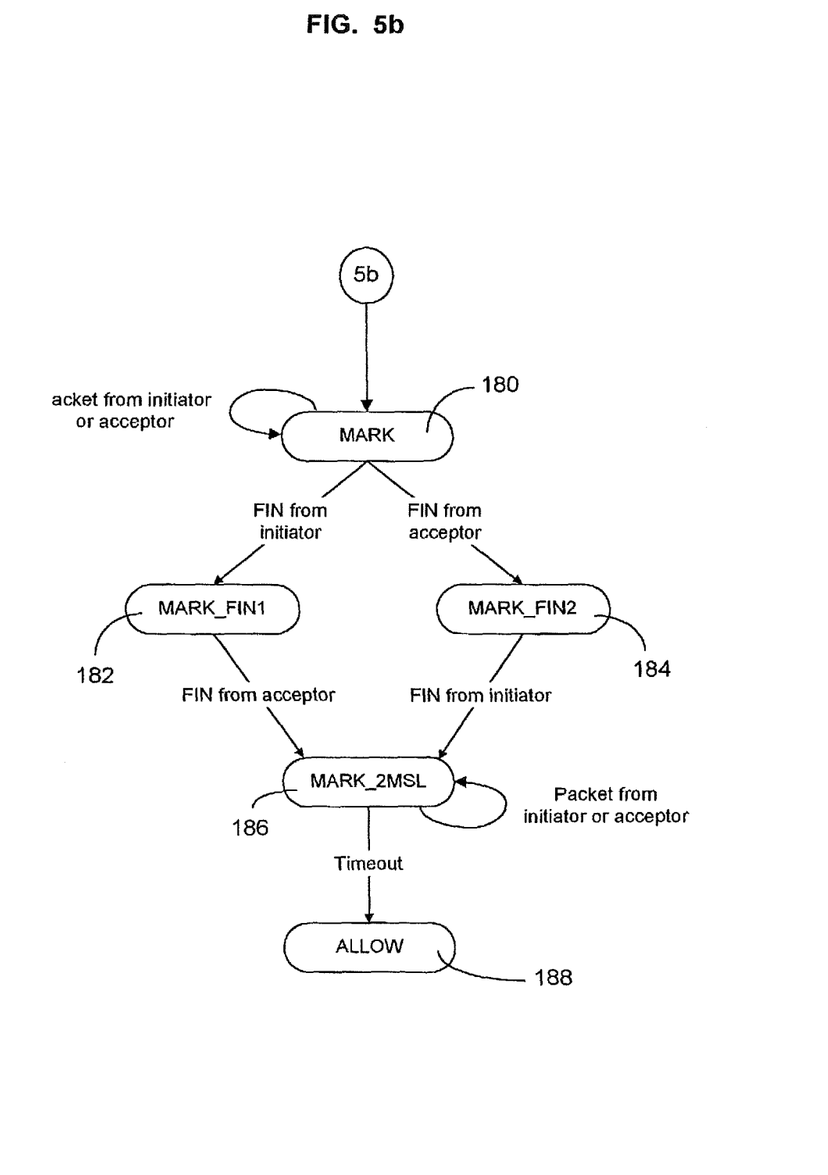

Referring now to FIGS. 5a and 5b, a state diagram of the states of a TCP protocol state machine is shown generally as 160. Table 1 describes the states and actions associated with state transitions of TCP protocol state machine 160. In Table 1, a blank field in the Next State column indicates that the state does not change.

TABLE 1

| Current State | Event | Next State | Action |
|---|---|---|---|
| START 162 | Initiator SYN packet | TCP_SYN | Forward to acceptor. Record initial sequence number, win_scale, MSS, and SACK. |

TABLE 1-continued

| Current State | Event | Next State | Action |
| --- | --- | --- | --- |
| TCP_SYN 164 | acceptor SYN/ACK packet | TCP_SYN_ACK | Forward to initiator. Record acceptor sequence number, win_scale, MSS, and SACK. |
| | Acceptor RST packet | ALLOW (delete session record) | Forward to initiator. |
| | Initiator SYN packet | | Forward to acceptor |
| TCP_SYN_ACK 166 | Initiator ACK | INSPECT | Forward to acceptor |
| | initiator ACK, with data | INSPECT | Run pattern match on packet and apply INSPECT state rules |
| | acceptor SYN/ACK packet | | Forward to initiator |
| | Initiator SYN packet | | Forward to acceptor |
| INSPECT 168 | Initiator packet, pattern match decides "allow" | ALLOW (delete session record) | Forward to acceptor |
| | Acceptor packet, pattern match decides "allow" | ALLOW (delete session record) | Forward to initiator |
| | Packet from initiator or acceptor, pattern match decides "divert" | DIVERT_SYN | Send SYN to divert host as though from initiator, save data from initiator |
| | Packet from initiator, pattern match undecided | | Forward to acceptor. Save the data in case divert is required. |
| | Packet from acceptor, pattern match undecided | | Remove data from packet, leaving only ACK; send to initiator |
| | Packet from initiator, pattern match decides "mark" | MARK | Apply marking to the packet, forward to acceptor. |
| | Packet from acceptor, pattern match decides "mark" | MARK | Apply marking to the packet, forward to initiator. |
| DIVERT_SYN 170 | Divert host SYN/ACK | DIVERTED | Replay saved client data to divert host. Send Reset to acceptor. |
| | Packet from acceptor | | Silently drop packet. |
| | Packet from initiator | | Re-send SYN to divert host. |
| DIVERTED or DIVERTED_FIN1 or DIVERTED_FIN2 (172, 174, 176 respectively) | Packet from initiator | | Re-map ACK number; send to divert host |
| | Packet from divert host | | Re-map sequence number; send to initiator |
| | Packet from acceptor | | Discard |
| | FIN received from initiator | DIVERTED_FIN1 | Re-map ACK number; send to divert host |
| | FIN received from divert host | DIVERTED_FIN2 | Re-map sequence number; send to initiator |
| DIVERTED_FIN1 174 | FIN received from divert host | DIVERTED_2MSL | Re-map sequence number; send to initiator |
| DIVERTED_FIN2 176 | FIN received from initiator | DIVERTED_2MSL | Re-map ACK number; send to divert host |
| DIVERTED_2MSL 178 | Packet from initiator | | Re-map ACK number; send to divert host |
| | Packet from divert host | | Re-map sequence number; send to initiator |
| | Packet from acceptor | | Discard |

TABLE 1-continued

| Current State | Event | Next State | Action |
|---|---|---|---|
| | Timeout | ALLOW (delete session record) | |
| MARK 182 | Packet from initiator | | Apply marking to the packet, forward to acceptor. |
| | Packet from acceptor | | Apply marking to the packet, forward to initiator. |
| | FIN from initiator | MARK_FIN1 | Apply marking to the packet, forward to acceptor. |
| | FIN from acceptor | MARK_FIN2 | Apply marking to the packet, forward to initiator. |
| MARK_FIN1 184 | FIN received from acceptor | MARK_2MSL | Apply marking to the packet, forward to initiator. |
| MARK_FIN2 186 | FIN received from initiator | MARK_2MSL | Apply marking to the packet, forward to acceptor. |
| MARK_2MSL 188 | Packet from initiator | | Apply marking to the packet, forward to acceptor. |
| | Packet from acceptor | | Apply marking to the packet, forward to initiator. |
| | Timeout | ALLOW | |
| ALLOW 180 | | | Session is deleted from session table. |

As shown in Table 1, INSPECT state 168 may remain in an undecided mode until it determines to allow or divert.

Not shown in FIG. 5 are timeout transitions from each state to the ALLOW state. These transitions have been omitted for clarity. When a session enters the ALLOW state, it is removed from the session state table. Therefore not finding a session in the table implies the ALLOW state and a policy of allowing the session to pass without diverting or marking it.

Figure 6:
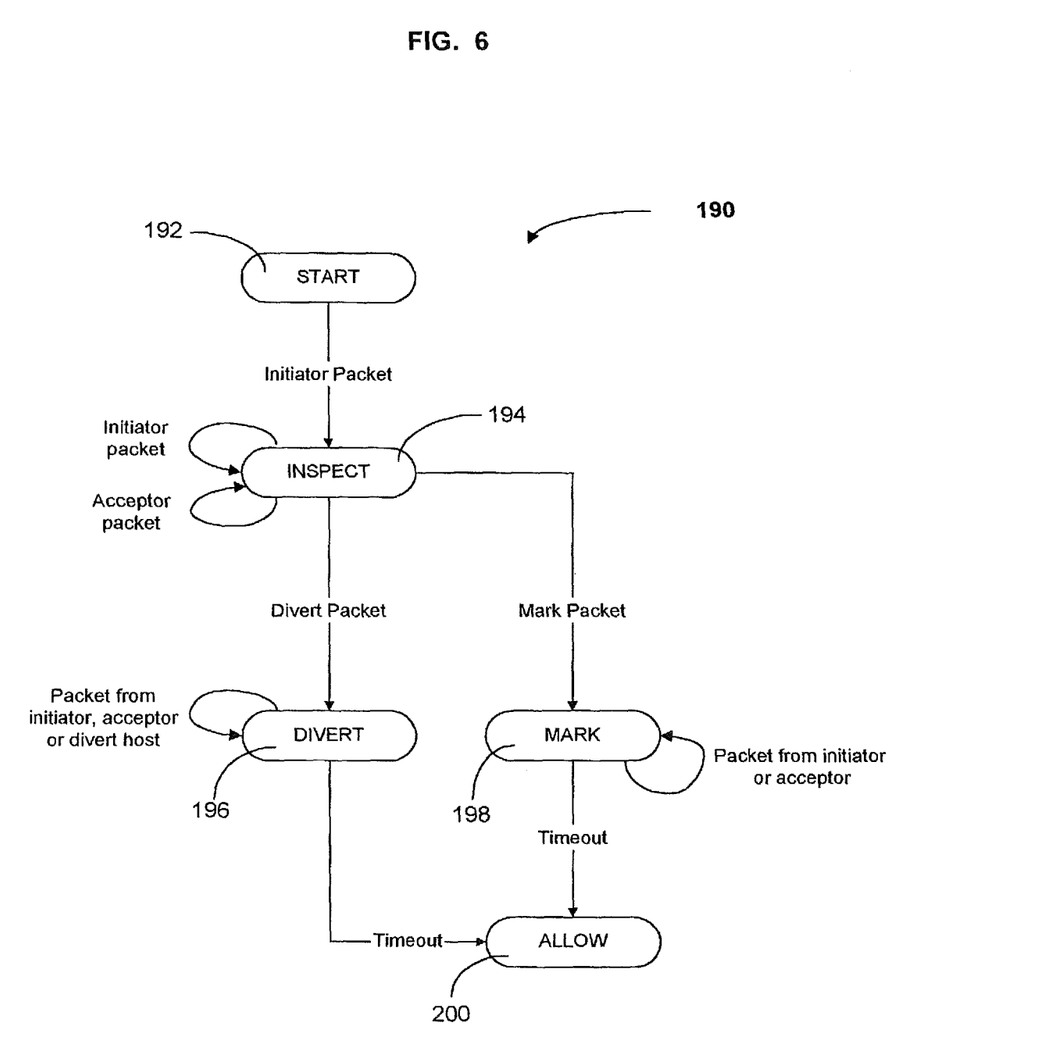
FIG. 6, is a state diagram of the states of a UDP protocol state machine.

Referring now to FIG. 6, a state diagram of the states of a UDP protocol state machine is shown generally as 190. Table 2 describes the states and actions associated with state transitions of UDP protocol state machine 190. In Table 2, a blank field in the Next State column indicates that the state does not change.

As the UDP protocol does not have a start indication (as SYN does with TCP), an implicit "allow" is not possible; any packet will create a session if it doesn't exist. Sessions are closed by timeout.

TABLE 2

| Current State | Event | Next State | Action |
|---|---|---|---|
| START 192 | Initiator packet | INSPECT | Forward to acceptor. |
| INSPECT 194 | Initiator packet, pattern match decides divert | DIVERT | Replay saved packets to divert host. Send current packet to divert host. |
| | Acceptor packet, pattern match decides divert. | DIVERT | Replay saved packets to divert host. Discard current packet. Send ICMP unreachable message. |
| | Initiator packet, pattern match decides mark. | MARK | Apply marking to the packet, forward to acceptor. |
| | Acceptor packet, pattern match decides mark. | MARK | Apply marking to the packet, forward to initiator. |
| | Initiator packet, pattern match undecided. | | Forward to acceptor, save packet for replay. |
| | Acceptor packet, pattern match undecided. | | Discard packet |
| DIVERT 196 | Initiator packet. | | Forward to divert host. Reset teardown timer. |
| | Divert packet. | | Forward to initiator. Reset teardown timer. |
| | Acceptor packet. | | Send ICMP unreachable message. Discard packet. |
| | Teardown timeout | ALLOW | |
| MARK 198 | Initiator packet. | | Apply marking to packet, forward to acceptor. Reset teardown timer. |
| | Acceptor packet. | | Apply marking to packet, forward to initiator. Reset teardown timer. |
| | Teardown timeout | ALLOW | |
| ALLOW 200 | | | Session is deleted from session table. |

Referring back to FIG. 4 we will now describe the functionality of pattern state machine 156. Each communication session has a pattern state associated with it. Pattern state machine 156 attempts to match the packets of a communication session to a protocol of interest.

When protocol state machine 154 is in the INSPECT state (168, 194), the pattern state of the current communication session is used in conjunction with the contents of the current packet to determine the next pattern state or to move protocol state machine 154 into another state.

Table 3 illustrates a simple example of a pattern state machine 156 that distinguishes between three protocols, namely:
1. one in which the initiator sends "GET"
2. another in which the initiator sends "Hello" and receives "Welcome"; and
3. a third in which the initiator sends "Hello" and receives anything other than "Welcome"

TABLE 3

| State | Event | Next State | Result |
|---|---|---|---|
| START | Initiator sends "Hello" | CLIENT_HELLO | Undecided |
| | Initiator sends "GET" | DIVERT | Divert, protocol 1 |
| | Initiator sends anything other than "GET" or "Hello" | ALLOW | Allow |
| CLIENT_HELLO | Acceptor sends "Welcome" | DIVERT | Divert, protocol 2 |
| | Acceptor sends something other than "Welcome" | DIVERT | Divert, protocol 3 |

Once a pattern is definitively matched, divert host 108 is chosen and a scheme is selected for tagging packets deliver to divert host 108. For example, the scheme could be VLAN tagging of Ethernet packets, MPLS tagging or some other form of tagging. The choice of scheme allows a divert host 108 to know which protocol is to be used, since divert host 108 may not otherwise have enough information to know the protocol.

The present invention resides in Traffic Switching Element (TSE) 106. TSE 106 is capable of marking or diverting in-progress communication sessions, including sessions using the TCP protocol, on the basis of pattern-matching the content of the communication. Marking packets in a communication stream allows devices such as distribution router 104 and core router 110 (see FIG. 1) to implement policy decisions on packets. Examples of marking include, but are not limited to: Differentiated Services Code Point (DSCP), and Type of Service (TOS).

The TCP standard (RFC: 793, Transmission Control Protocol, DARPA Internet Program, Protocol Specification, September 1981), specifies "sequence numbers" to be carried within each packet to indicate the relative position of the packet with respect to the start of the communication session. Also "acknowledgement numbers" are carried within packets traveling in the opposite direction to indicate which data has been received. Since the initial sequence number for each session is chosen arbitrarily by the acceptor, the chance is very low that a divert host 108 would choose the same initial sequence number as the original acceptor 124.

One solution to the problem is to indicate to divert host 108 which initial sequence number was used by acceptor 124. However, since there is currently no standard for communicating this, custom modification of divert host 108 is required.

In the present invention sequence numbers sent from divert host 108 to initiator 122 are re-mapped. In the present invention, splicing includes re-mapping of sequence numbers set from divert host 108 to initiator 122. When a packet is received by TSE 106 from a divert host 108, the sequence number is increased by the difference between the initial sequence number of the acceptor 124 and the initial sequence number of the divert host 108. Similarly, acknowledgement numbers in packets traveling from initiator 122 to divert host 108 are decreased by the same difference. For those packets containing TCP selective-acknowledgement fields, the selective-acknowledgements are treated the same as the acknowledgement numbers.

TCP RFC 1323, TCP Extensions for High Performance, May 1992, requires each TCP packet to contain a "window" value, which represents how many bytes may be sent without acknowledgement. The standard also provides for an optional "window scaling" parameter to be provided by each node to packets containing the SYN flag. This scaling indicates how the window field is to be interpreted and is to be used for the duration of the session. A difficulty is that a divert host 108 may choose a different window scaling than that of acceptor 124. As with sequence numbers, divert host 108 could theoretically be informed of which value to use. However, without a standard way of communicating this, custom modification of divert host 108 would be required.

The inventors have chosen to re-scale window values into the correct range. In the preferred embodiment, when splicing, the inventors have chosen to re-scale window values into the correct range. For a packet from divert host 108 being sent to an initiator 122, the window value is scaled down by the difference between the window scale of acceptor 124 and the window scale of divert host. If the difference is negative the window is scaled up.

Although the examples presented herein are for TCP/IP and UDP, making a decision to alter a communication session transparently based on the contents of it can be applied to other communication protocols.

Although the present invention has been described as being a software based invention, it is the intent of the inventors to include computer readable forms of the invention. Computer readable forms meaning any stored format that may be read by a computing device.

Although the present invention has been described with reference to certain specific embodiments, various modifications thereof will be apparent to those skilled in the art without departing from the spirit and scope of the invention as outlined in the claims appended hereto.

We claim:

1. A system for diverting an established communication session comprising:
one or more processors connected to a memory storing instructions executable by the at least one processor to implement:
a traffic switching element configured to examine said established communication session between a first node and a second node while allowing one or more packets to flow bidirectionally between the first node and said second node;
a protocol state machine operatively connected to the traffic switching element and configured to determine a protocol of the established communication session from a plurality of protocols based on the one or more packets and determine if the protocol matches a pattern that indicates a protocol of interest and a state of the established communication session indicates the established communication session is a candidate for being diverted;
wherein if the protocol matches, the traffic switching element diverts traffic from the first node or the second node to a divert host, by establishing a new communication session with the divert host and terminating the connection to the first or second node and splicing the established communication session with the new communication session and adapting subsequent packets;

wherein if the established communication session uses TCP, the adapting subsequent packets comprises:

remapping sequence numbers and acknowledgment numbers, based upon the difference between the initial sequence numbers of the node the divert host is replacing and the divert host; and rescaling window size based upon the difference between window scale values of the node the divert host is replacing and the divert host; and a session state manager, operatively connected to the traffic switching element, configured to track a progression of the established communication session and update the state of the established communication session for use with the new communication session.

2. The system of claim 1 further comprising a tagging element configured to tag packets delivered to the divert host, wherein the tagging indicates a communication protocol.

3. The system of claim 1 wherein the session state manager maintains a plurality of session state records to permit a plurality of simultaneous communication sessions to be examined.

4. The system of claim 1 wherein if the protocol state machine determines the protocol of the established communication session does not match a pattern that indicates a protocol of interest, the protocol state machine allows the communication session to proceed without establishing a new communication session.

5. A system for diverting an established communication session between a first node and a second node comprising:

one or more processors connected to a memory storing instructions executable by the at least one processor to implement:

a traffic switching element configured to examine the established communication session at a monitoring point between the first node and second node while allowing one or more packets to flow bidirectionally between the first node and the second node;

a session state manger configured to track a progression of the established communication session and update the state of the established communication session;

a protocol state machine configured to determine a protocol of the established communication session based on the one or more packets and determine if the protocol matches a pattern that indicates a protocol of interest;

if the protocol matches:

establishing a new communication session between the monitoring point and a divert host; and the traffic switching element configured to terminate the connection between the monitoring point and one of the first or second node and splicing the established communication session with said new communication session using the state of the established communication session and adapting subsequent packets;

wherein if the established communication session uses TCP, the adapting subsequent packets comprises:

remapping sequence numbers and acknowledgment numbers, based upon the difference between the initial sequence numbers of the node the divert host is replacing and the divert host; and rescaling window size based upon the difference between window scale values of the node the divert host is replacing and the divert host.

6. A system for diverting an established communication session comprising:

one or more processors connected to a memory storing instructions executable by the at least one processor to implement:

a traffic switching element configured to examine the established communication session at a monitoring point between a first node and a second node while allowing one or more packets to flow bidirectionally between said first node and said second node;

a session state manager configured to track a progression of the established communication session and update a state of the established communication session based on said one or more packets;

a protocol state machine configured to determine a protocol of the established communication session from a plurality of protocols based on said one or more packets;

wherein, if the protocol matches a pattern that indicates a protocol of interest and a current state of the established communication session is equivalent to an inspect state, the traffic switching element is configured to divert traffic from the first node or the second node to a divert host, by initiating and establishing a new communication session with the divert host by, terminating the connection to the first or second node and splicing the established communication session with the new communication session by adapting subsequent packets, at the traffic switching element, for the first node, second node, or divert host to the current state of the established communication session, wherein if the established communication session uses TCP, the adapting subsequent packets comprises:

remapping sequence numbers and acknowledgment numbers, based upon the difference between the initial sequence numbers of the node the divert host is replacing and the divert host; and rescaling window size based upon the difference between window scale values of the node the divert host is replacing and the divert host.

7. The system of claim 6 further comprising tagging packets delivered to the divert host wherein the tagging indicates a communication protocol.

8. The system of claim 6 wherein the session state manager maintains a plurality of session state records to permit a plurality of simultaneous communication sessions to be examined.

9. The system of claim 6 further comprising if the protocol of the established communication session does not match a pattern that indicates a protocol of interest, allowing the communication session to proceed without establishing a new communication session.

10. The system of claim 6 wherein the tracking of the progression of the established communication session comprises:

the session state manager creating a new session state record if at least one of the packets comprises a SYN flag set.

11. The system of claim 6 wherein the current state of the session is maintained as the inspect state until the traffic switching element determines whether to allow or divert the established communication session.

12. The system of claim 6 wherein the state session manager updates the state of the new communication session to a divert state.

\* \* \* \* \*